Dec. 25, 1956 S. R. CROCKETT 2,775,202
GYROSCOPIC ROLL CONTROL SYSTEM FOR AIRCRAFT
Filed Oct. 26, 1951 2 Sheets-Sheet 1

INVENTOR.
SYDNEY R. CROCKETT
BY
ATTORNEYS

Dec. 25, 1956          S. R. CROCKETT          2,775,202
GYROSCOPIC ROLL CONTROL SYSTEM FOR AIRCRAFT
Filed Oct. 26, 1951          2 Sheets-Sheet 2
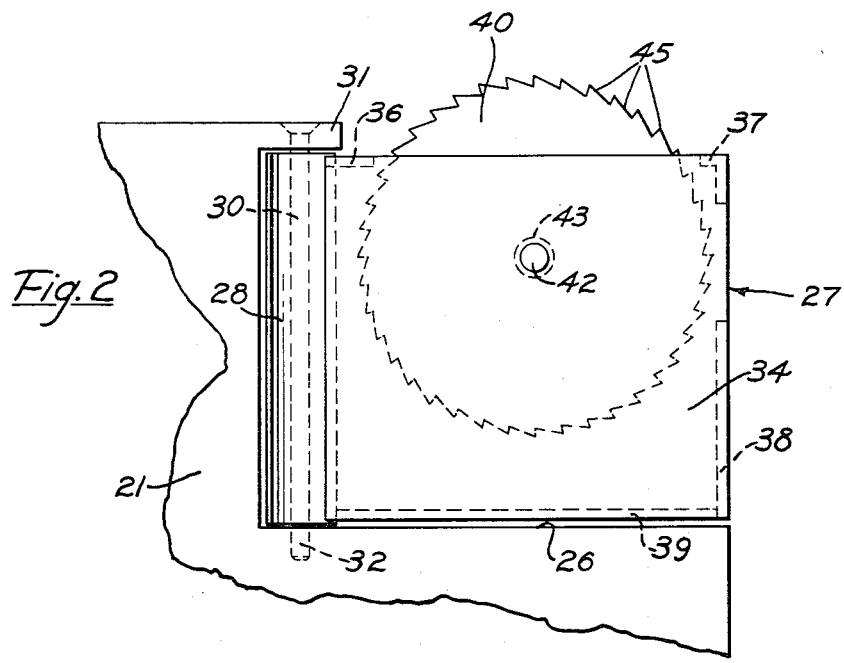
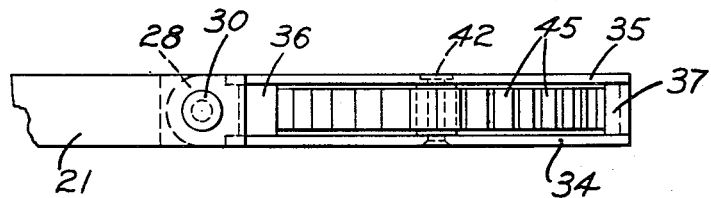
*INVENTOR.*
SYDNEY R. CROCKETT
BY
ATTORNEYS.

United States Patent Office 2,775,202
Patented Dec. 25, 1956

2,775,202

GYROSCOPIC ROLL CONTROL SYSTEM FOR AIRCRAFT

Sydney R. Crockett, Inyokern, Calif.

Application October 26, 1951, Serial No. 253,438

12 Claims. (Cl. 102—50)

(Granted under Title 35, U. S. Code (1952), sec. 266)

This invention relates to a gyroscopic roll control system for aircraft, which will prevent, or limit to a predetermined value, the rotation of the aircraft about its longitudinal axis. The invention is particularly applicable to rockets, high speed missiles, and guided missiles.

If a missile is to be guided, it is necessary for control purposes to limit the roll of the missile so that the complete control cycle is carried out in a single plane or as near thereto as possible.

In the present invention, roll control is accomplished by control surfaces each of which includes a gyro-wheel, the arrangement being such that as the missile begins to roll, the gyro-wheel will precess and deflect the control surfaces differentially and in such direction as to set up a control torque which opposes the torque causing the missile to roll. This is accomplished directly, without a roll sensing device, servo-motors, or remote control means. The gyro-wheel is energized by the airstream and is incorporated in the control surface so that precession of the gyro-wheel moves the control surface with it to cause deflection thereof in the desired direction.

An object of the present invention is to provide improved and simplified means to control roll in aircraft.

A further object of the invention is to provide roll control means energized by the airstream and acting directly on the control surface to prevent or limit roll of a missile.

Other objects and many of the attendant advantages of this invention will be readily appreciated as the same becomes better understood by reference to the following description.

Fig. 2 is an enlarged view in elevation of one of the control devices shown in Fig. 1;

Fig. 3 is a plan view of the device shown in Fig. 2; and

Figure 1:
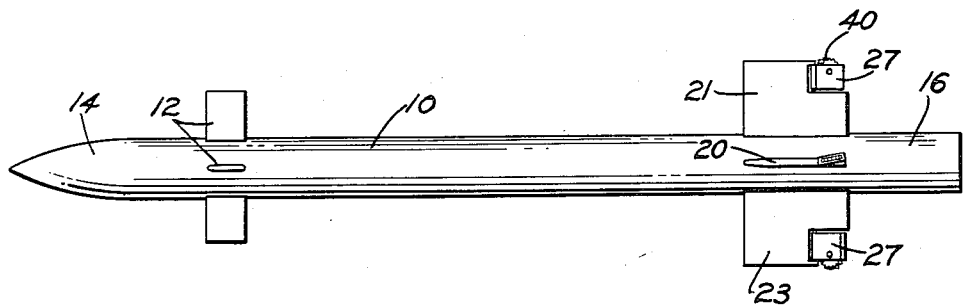
Fig. 1 is a diagrammatic view in side elevation of a missile provided with roll control apparatus embodying the invention.

The device shown by way of illustration in the drawings is a missile having a body 10, forward fins 12, an ogive 14, and a power plant 16 having a nozzle 18, all of known design.

Toward the rear of the body 10 are mounted a plurality (preferably four) of wings 20, 21, 22, 23, fixed to the outer surface of the body by means of straps 24, riveted or otherwise secured to the wings and to each other. At its rear outer corner, each of the wings is cut away to form a rectangular space 26 to accommodate the control surfaces 27 now to be described.

As indicated in Fig. 2, each of the control surfaces includes a forward post 28 bored to receive a radial pintle 30 which extends through a projection 31 on the wing through the post 28, and into a socket indicated at 32. The body of the surface is formed with opposite plates 34, 35 which are held in spaced relation by means of spacers indicated at 36, 37, 38, 39, thus forming a compartment, open at top as viewed in Fig. 2, to house the gyro-wheel 40.

The axle 42 of gyro-wheel 40 is mounted in anti-friction bearings 43 in plates 34, 35. The gyro-wheel extends through the opening between spacers 36 and 37 so as to be exposed to the airstream when the missile is in flight. The periphery of the gyro-wheel is provided with buckets or vanes 45 to act as impellers and cause the gyro-wheel to rotate in the clockwise direction as viewed in Fig. 2. If desired, means may be provided to impart an initial angular velocity to the gyro-wheel prior to or simultaneously with the starting of the power plant, so that it will be functioning when the missile is launched.

It will be seen that each wing lies in a plane which extends radially outwardly relative to the body 10, and that the control surface 27 normally lies in the same plane, and can be moved therefrom during flight only by positive force exerted by the gyro-wheel 40 against the force of air pressure tending to deflect it back into the plane of the wing. The axis of the gyro-wheel 40 is disposed transverse to the plane of the control surface, and is thus normally transverse to the plane of the wing.

Operation

Figure 4:
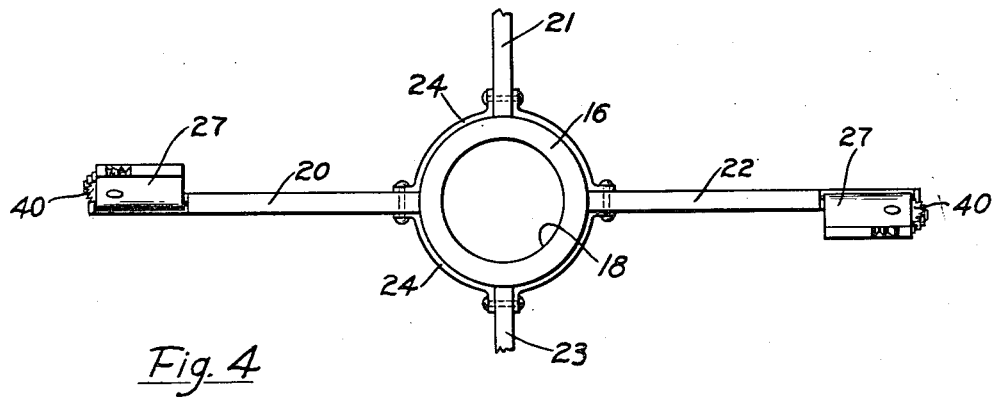
Fig. 4 is a fragmentary view of the missile from the rear, showing two of the control surfaces in deflected position.

Let it be assumed that the missile is in flight, without roll, and that the gyro-wheels are rotating at sufficient speed to produce adequate control torque. Let it now be assumed that a disturbing torque is created by aerodynamic misalignment and/or nozzle malalignment, causing the missile to begin to roll about its longitudinal axis in the clockwise direction as viewed in Fig. 4. This roll will move each of the gyro-wheels out of its plane of rotation, causing them to precess about their respective pintles 30. The result will be that each of the surfaces 27 will be deflected, as indicated in Figs. 1 and 4, in such direction as to damp the rolling motion, after which each of the surfaces will return to neutral position in the plane of its wing. Rolling of the missile in the counterclockwise direction will cause the surfaces 27 to deflect in the opposite direction. The result will be that rolling motion of the missile in either direction is quickly damped.

If desired, the wings 20–23 may be so canted as to produce a rolling torque which when combined with the produced control torque will roll the missile at a predetermined rate, in which case the surfaces will act to limit rolling motion to this predetermined value.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. An aircraft comprising an elongated body having a longitudinal axis, a plurality of wings fixed thereto and extending radially therefrom, a recessed control surface hinged to one of said wings in the plane of the wing and spaced outwardly from the body, and a gyro-wheel mounted within the recess of said surface and rotatable on an axis perpendicular thereto.

2. The invention defined in claim 1, wherein each of said wings is provided with a control surface and gyro-wheel.

3. The invention defined in claim 1, wherein a portion of the gyro-wheel is exposed to and rotated by the airstream when the craft is in flight.

4. The invention defined in claim 1, wherein the gyro-wheel is provided with peripheral vanes, and a portion of the periphery of the gyro-wheel projects beyond the conrol surface whereby it is exposed to and driven by the airstream when the craft is in flight.

5. Roll control mechanism for a missile having an elongated body with its longitudinal axis in the line of flight, comprising a frame fixed to said body and extending radially therefrom, a control surface hinged to said frame and spaced radially from said body, a gyro-wheel carried by said surface with its axis normally perpendicular to said surface, and means for rotating said gyro-wheel in such direction that precession of the gyro-wheel due to roll of the missile will deflect the surface in a direction to tend to arrest said roll.

6. Roll control mechanism for a missile having an elongated body with its longitudinal axis in the line of flight of the missile, comprising a frame fixed to said body and extending outwardly therefrom, a recessed airfoil hinged to said frame on a radial axis and spaced radially from said body, a gyro-wheel mounted within said airfoil with its axis perpendicular to the plane of said foil, and vanes on the periphery of said gyro-wheel extending beyond the outer edge thereof so as to be exposed to the airstream when the missile is in flight thereby to rotate the gyro-wheel in such direction that precession of the gyro-wheel due to roll of the missile will deflect the airfoil in a direction to tend to arrest said roll.

7. Roll control mechanism for a craft having a body with a longitudinal axis, comprising a frame extending outwardly from said body, a recessed foil hinged to said frame on an axis radial relative to said body, a gyro-wheel mounted within the recess of said foil with its spin axis journaled in said foil perpendicular to the plane of the foil, and means for spinning said gyro-wheel whereby precession thereof due to roll of the craft will deflect said foil.

8. Roll control mechanism for a craft having an elongated body with a longitudinal axis, comprising a foil, supporting means for said foil maintaining the same in radially hinged relation to said body and displaced laterally therefrom, a gyro-wheel carried by said foil with its spin axis perpendicular to the plane of the foil, and means for spinning said gyro-wheel whereby roll of the craft will cause precession of the gyro-wheel and deflection of the foil.

9. Roll control mechanism for a missile having an elongated body with its longitudinal axis in the line of flight, comprising a plane wing fixed to said body and extending outwardly therefrom, a control surface hinged to said wing in the plane of the wing and spaced outwardly from the body, a gyro-wheel carried by said surface with its spin axis perpendicular to said surface, and means for spinning said gyro-wheel in such direction that precession of the gyro-wheel due to roll of the missile will deflect the surface in a direction to oppose said roll.

10. A missile comprising a body having a longitudinal axis, a flat wing fixed to said body and extending outwardly therefrom in the plane of said axis, a control surface hinged to said wing in the plane of the wing, a gyro-wheel carried by said surface with its spin axis transverse to said surface, and means for spinning said gyro-wheel in such direction that precession thereof due to roll of the missile will deflect the surface in a direction to oppose said roll.

11. A missile comprising a body having a longitudinal axis, a wing fixed thereto and extending outwardly therefrom, a recessed airfoil hingedly connected to said wing for movement about an axis in the plane of the wing, and a gyro-wheel mounted within the recess of said airfoil with its spin axis journaled in said foil perpendicular to the plane of the foil.

12. The invention defined in claim 11, wherein the gyro-wheel is provided with peripheral vanes exposed to and rotated by the airstream when the missile is in flight.

References Cited in the file of this patent

UNITED STATES PATENTS

| | | |
|---|---|---|
| 1,459,198 | Dunajeff | June 19, 1923 |
| 1,495,108 | Resh et al. | May 20, 1924 |
| 1,592,081 | Colvin | July 13, 1926 |
| 2,584,826 | Wyckoff | Feb. 5, 1952 |

FOREIGN PATENTS

| | | |
|---|---|---|
| 346,489 | Italy | Feb. 17, 1937 |